(12) United States Patent
Xie

(10) Patent No.: US 10,012,852 B2
(45) Date of Patent: Jul. 3, 2018

(54) COLOR FILTER SUBSTRATE AND LIQUID CRYSTAL DISPLAY APPARATUS

(71) Applicant: Wuhan China Star Optoelectronics Technology Co., Ltd., Wuhan, Hubei (CN)

(72) Inventor: Chang Xie, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 151 days.

(21) Appl. No.: 15/127,396

(22) PCT Filed: Jul. 27, 2016

(86) PCT No.: PCT/CN2016/091883
§ 371 (c)(1),
(2) Date: Sep. 19, 2016

(87) PCT Pub. No.: WO2017/219439
PCT Pub. Date: Dec. 28, 2017

(65) Prior Publication Data
US 2018/0157081 A1    Jun. 7, 2018

(30) Foreign Application Priority Data
Jun. 21, 2016  (CN) .......................... 2016 1 0451401

(51) Int. Cl.
*G02F 1/133* (2006.01)
*G02F 1/1335* (2006.01)
*G02F 1/1362* (2006.01)
*G02F 1/1333* (2006.01)

(52) U.S. Cl.
CPC .... *G02F 1/13306* (2013.01); *G02F 1/133512* (2013.01); *G02F 1/133514* (2013.01); *G02F 1/133528* (2013.01); *G02F 1/136286* (2013.01); *G02F 2001/13324* (2013.01); *G02F 2001/133302* (2013.01); *G02F 2201/121* (2013.01); *G02F 2201/123* (2013.01)

(58) Field of Classification Search
CPC ............ G02F 1/1335; G02F 1/133528; G02F 1/1368; G02F 1/133512; G02F 1/133514; G02F 1/1333; G02F 1/133305; G02F 1/133345; G02F 1/136; G02F 1/1362; G02F 2001/133531; G02F 2001/133562; G02F 2001/133548; H01L 27/322; H01L 27/3262; H01L 51/5284; H01L 51/5293; H01L 21/76802; G02B 5/3025
USPC ............... 349/106, 43, 96, 110, 158; 257/40
See application file for complete search history.

(56) References Cited

U.S. PATENT DOCUMENTS

2007/0102035 A1* 5/2007 Yang ................. G02F 1/133512
                                                        136/244

* cited by examiner

*Primary Examiner* — Thoi Duong
(74) *Attorney, Agent, or Firm* — Andrew C. Cheng

(57) ABSTRACT

The present application discloses a color filter substrate, including a glass substrate, a polarizer laminated on one surface of the glass substrate and a black matrix region disposed on the other surface of the glass substrate, the color filter substrate further including: a solar cell disposed on the glass substrate, and located between the glass substrate and the black matrix region, the polarizer comprising a hollow region to expose the glass substrate, the hollow region disposed opposite to the solar cell and the orthogonal projection of the solar cell covering the hollow region, the ambient light enters the glass substrate through the hollow region.

15 Claims, 1 Drawing Sheet

COLOR FILTER SUBSTRATE AND LIQUID CRYSTAL DISPLAY APPARATUS

CROSS REFERENCE

This application claims the priority of Chinese Patent Application No. 201610451401.8, entitled "COLOR FILTER SUBSTRATE AND LIQUID CRYSTAL DISPLAY APPARATUS", filed on Jun. 21, 2016, the disclosure of which is incorporated herein by reference in its entirety.

FIELD OF THE INVENTION

The present application relates to a liquid crystal display technology field, and more particularly to a color filter substrate and a liquid crystal display apparatus.

BACKGROUND OF THE INVENTION

The Liquid Crystal Display, LCD have a thin, low power consumption, digital, etc. advantages, and more and more widely used in the market currently. Since the liquid crystal itself does not emit light, and cannot rely on natural light, and must have a backlight source to obtain a stable, clear display. In general, the electrical energy source of the backlight source is from the external battery, the storage capacity of the battery is limited, often charging is needed to the battery, and is inconvenience to the user. In the conventional display technology, when light passes through the substrate from the color filter, in which the black matrix region is completely opaque, if the light emit from the backlight source is 100%, after passing each layers structure of the liquid crystal panel, the entire transmittance of light is only 3% to 6%. Due to the entire transmittance of each layers of the liquid crystal panel is low, resulting in a poor transmittance of the conventional liquid crystal display device, or in order to maintain a high transmittance, a higher voltage needs to be applied to the panel, so the power consumption of the liquid crystal display device is large, poor battery life, and limited application range.

SUMMARY OF THE INVENTION

The main technology problem solved in the present application is to provide a color filter substrate and a liquid crystal display apparatus to sufficiently use of light source and save the power consumption.

In order to solve the technology problem above, the technology approach adapted in the present application is providing as followed:

The present application provides a color filter substrate, including a glass substrate, a polarizer laminated on one surface of the glass substrate and a black matrix region disposed on the other surface of the glass substrate, the color filter substrate further including: a solar cell disposed on the glass substrate, and located between the glass substrate and the black matrix region, the polarizer including a hollow region to expose the glass substrate, the hollow region disposed opposite to the solar cell and the orthogonal projection of the solar cell covering the hollow region, the ambient light enters the glass substrate through the hollow region.

wherein the orthogonal projection of the hollow region on the glass substrate is completely overlap with the orthographic projection of the solar cell on the glass substrate, or the orthogonal projection of the hollow region on the glass substrate is within the orthographic projection of the solar cell on the glass substrate.

wherein the color filter substrate further including a regularly arranged sub-pixels, the black matrix region including a plurality of black matrix spaced apart by the sub-pixels, the solar cell is disposed between the black matrix and the glass substrate.

wherein the ambient light is natural light.

wherein the color filter substrate including an insulating layer for isolation the electrical connection of the solar cell and the other components of the color filter substrate.

wherein the color filter substrate further including a common electrode layer, and the common electrode layer covers the solar cell.

The present application also provides a liquid crystal display apparatus, including a color filter substrate, an array substrate and a liquid crystal layer sandwiched between the color filter substrate and the array substrate.

wherein the array substrate at least including a glass substrate, a metal wiring provided on the surface of the glass substrate toward the liquid crystal layer, and a polarizer provided on the outer surface of the glass substrate, the liquid crystal display apparatus further including: a first solar cell disposed between the glass substrate of the array substrate and the metal wiring, the polarizer including a hollow region to expose the glass substrate, the first solar cell covers the hollow region, the orthogonal projection of the hollow region is in the black matrix region.

wherein the metal wiring including a data line, a scanning line and a pixel electrode.

wherein the liquid crystal display apparatus including a flexible circuit board and a backlight module, the first solar cell is electrically connected to the flexible circuit board and/or the backlight module.

The color filter substrate of the present application forms the hollow region in manufacturing the color filter polarizer to makes partial region of the polarizer is the hollow region, so that the light passing through the polarizer, the light pass the potion disposed of the solar cell can be passed by the slit, comparing with the transmittance is around 43% of the polarizer in the conventional technology, the light passing the hollow region with transmittance close to 100%, thus greatly increasing the light transmission rate, makes more ambient light can irradiation to the surface of the solar cell, to improve the utilization of the solar energy, and integrated into the color filter substrate to reduce the original energy consumption. The present application raise the utilization of solar energy and light efficiency, and decrease the power consumption of the liquid crystal display apparatus.

BRIEF DESCRIPTION OF THE DRAWINGS

In order to more clearly illustrate the embodiments of the present application or prior art, the following figures will be described in the embodiments are briefly introduced. It is obvious that the drawings are merely some embodiments of the present application, those of ordinary skill in this field can obtain other figures according to these figures without paying the premise.

DETAILED DESCRIPTION OF PREFERRED EMBODIMENTS

Embodiments of the present application are described in detail with the technical matters, structural features, achieved objects, and effects with reference to the accompanying drawings as follows. It is clear that the described embodiments are part of embodiments of the present application, but not all embodiments. Based on the embodiments of the present application, all other embodiments to those of ordinary skill in the premise of no creative efforts obtained should be considered within the scope of protection of the present application.

Specifically, the terminologies in the embodiments of the present application are merely for describing the purpose of the certain embodiment, but not to limit the invention. Examples and the claims be implemented in the present application requires the use of the singular form of the book "an", "the" and "the" are intend to include most forms unless the context clearly dictates otherwise. It should also be understood that the terminology used herein that "and/or" means and includes any or all possible combinations of one or more of the associated listed items.

Figure 1:
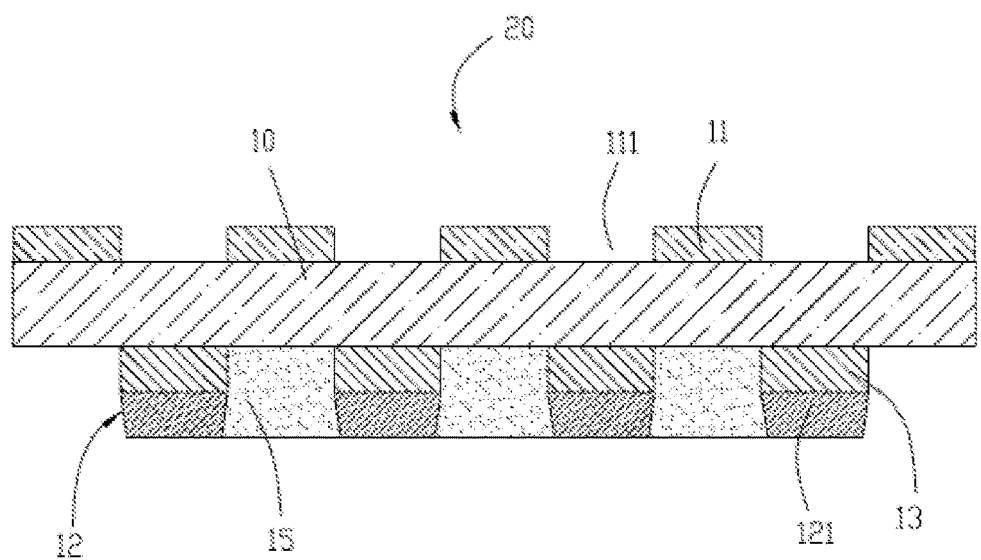
FIG. 1 is a schematic cross-sectional structure of partial of the color filter substrate of the present application.

Referring to FIG. 1, the present application provides a color filter substrate 20 including a glass substrate 10, a polarizer 11 is laminated on one surface of the glass substrate 10 and a black matrix region 12 disposed on the other surface of the glass substrate 10. The color filter substrate further includes: a solar cell 13 disposed on the glass substrate 10, and located between the glass substrate 10 and the black matrix region 12. The polarizer 11 includes a hollow region 111 to expose the glass substrate 10, the hollow region 111 disposed opposite to the solar cell 13 and the orthogonal projection of the solar cell 13 covering the hollow region 111, the ambient light enters the glass substrate 10 through the hollow region 111. The color filter substrate includes regularly arranged sub-pixels 15, the black matrix region 12 includes a plurality of black matrix 121 spaced apart by the sub-pixels 15, the solar cells 13 are disposed corresponding to all of the black matrix 121. The sub-pixel 15 includes a red sub-pixel, a green sub-pixel, and a blue sub-pixel disposed in interval by the black matrix, it may also include white sub-pixel. The solar cell is located in the orthogonal projection region by the black matrix region 121 to the glass substrate 10. The ambient light is natural light.

In this embodiment, the orthogonal projection of the hollow region 111 on the glass substrate 10 is completely overlap with the orthographic projection of the solar cell 13 on the glass substrate 10, or the orthogonal projection of the hollow region 111 on the glass substrate 10 is within the orthographic projection of the solar cell 13 on the glass substrate 10 to prevent the light passing through the hollow region 111 directly into the pixel.

In this embodiment, the color filter substrate 20 includes an insulating layer (not shown) for isolation the electrical connection of the solar cell 13 and the other components of the color filter substrate.

In this embodiment, the color filter substrate 20 further includes a common electrode layer (not shown), the common electrode layer covers the solar cell, and is used for storage the backlight source of the color filter substrate for the liquid crystal display.

When the light of the present application is irradiated to the surface of the color filter substrate 20, the light pass through the hollow region 111 of the polarizer 11, pass through the glass substrate 10 and the peripheral edge of the hollow region 111, and formed a translucent slit of the peripheral edge of the solar cell 13, the solar cell 13 can collect the light of the backlight source, converting the light energy into electrical energy, for secondary use. The converted electrical energy from the solar cell 13 can be stored in batteries of phone or tablet or other terminals; it can also be directly used for the electrical power of backlight source and panel signal lines. The working principle of the solar cell 13 is the photoelectric effect, by the use of light—electrical direct conversion way, the light radiation energy is directly converted into electrical energy. Specifically, the solar cell 13 is a semiconductor photodiode including a PN junction of a n-type semiconductor thin film and a p-type semiconductor thin film, also known as a photoelectric conversion thin film, when the light is irradiated to the photoelectric conversion thin film, it will be able to generate electricity. The light can be emitted from the backlight source, or it can also be sunlight.

The color filter substrate of the present application is to remove partial of the polarizer 11 of the position directly facing to the solar cell 13, the light entering the color filter substrate from the hollow region 111, with the light transmittance close to 100%, thus greatly increasing the light transmission rate, and its integration into the color filter substrate in order to reduce the original energy consumption, improve the utilization of solar energy and light efficiency.

Figure 2:
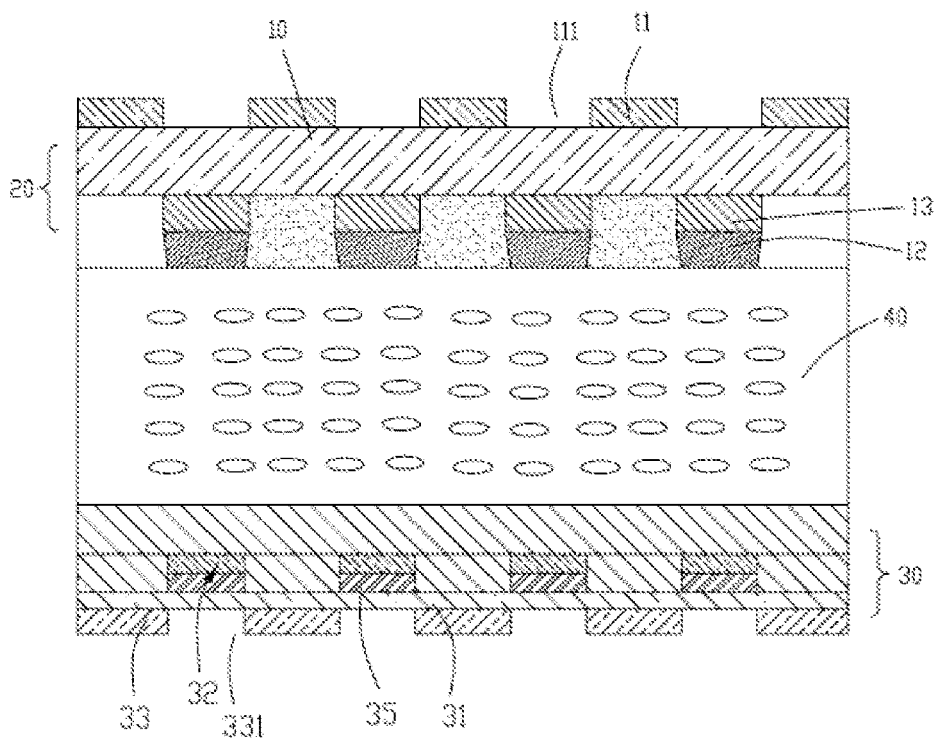
FIG. 2 is a schematic cross-sectional structure of liquid crystal display apparatus of the present application.

Referring to FIG. 2, the present application also provides a liquid crystal display apparatus including the color filter substrate 20, an array substrate 30 and a liquid crystal layer 40 sandwiched between the color filter substrate 20 and the array substrate 30. The liquid crystal display apparatus adapted the color filter substrate 20 with the solar cell and the polarizer of the color filter substrate 20 is provided with hollow region.

Wherein, the array substrate 30 at least includes a glass substrate 31, a metal wiring 32 provided on the surface of the glass substrate 31 toward the liquid crystal layer 40, and a polarizer 33 provided on the outer surface of the glass substrate 31, the liquid crystal display apparatus further including: a first solar cell 35 disposed between the glass substrate 31 of the array substrate 30 and the metal wiring 32. The polarizer 33 includes a hollow region 331 to expose the glass substrate, the first solar cell 35 covers the hollow region 331. Wherein, the metal wiring 32 includes a data line, a scanning line and a pixel electrode. Wherein the liquid crystal display apparatus includes a flexible circuit board and a backlight module, the first solar cell is electrically connected to the flexible circuit board and/or the backlight module. The orthogonal projection of the hollow region 331 on the glass substrate 31 is completely overlap with the orthogonal projection of the first solar cell 35 on the glass substrate 31, the light can enter the glass substrate 31 through the hollow region 331, and the light is into the liquid crystal cell from the glass substrate 31 and bypass the metal wiring 32, and increases the light transmittance, reducing the power consumption of the liquid crystal display apparatus, and the orthographic projections of each of the hollow region 331 are in the black matrix 121 of the black matrix region of the color filter substrate, that is, the orthographic projection of the first solar cell 35 corresponding to each of the hollow region is inside the black matrix 121, and ensuring the aperture ratio.

Above are embodiments of the present application, which does not limit the scope of the present application. Any modifications, equivalent replacements or improvements within the spirit and principles of the embodiment described above should be covered by the protected scope of the invention.

What is claimed is:

1. A color filter substrate, comprising a glass substrate, a polarizer laminated on one surface of the glass substrate and a black matrix region disposed on the other surface of the glass substrate, wherein the color filter substrate further comprises a solar cell disposed on the glass substrate, and located between the glass substrate and the black matrix region, the polarizer comprising a hollow region to expose the glass substrate, the hollow region disposed opposite to the solar cell and the orthogonal projection of the solar cell covering the hollow region, the ambient light enters the glass substrate through the hollow region.

2. The color filter substrate according to claim 1, wherein the orthogonal projection of the hollow region on the glass substrate is completely overlapped with the orthographic projection of the solar cell on the glass substrate, or the orthogonal projection of the hollow region on the glass substrate is within the orthographic projection of the solar cell on the glass substrate.

3. The color filter substrate according to claim 2, wherein the ambient light is natural light.

4. The color filter substrate according to claim 1, wherein the color filter substrate further comprises a regularly arranged sub-pixels, the black matrix region comprising a plurality of black matrix spaced apart by the sub-pixels, the solar cell is disposed between the black matrix and the glass substrate.

5. The color filter substrate according to claim 1, wherein the color filter substrate comprises an insulating layer for isolation the electrical connection of the solar cell and the other components of the color filter substrate.

6. The color filter substrate according to claim 1, wherein the color filter substrate further comprises a common electrode layer, and the common electrode layer covers the solar cell.

7. A liquid crystal display apparatus, comprising a color filter substrate, an array substrate and a liquid crystal layer sandwiched between the color filter substrate and the array substrate, the color filter substrate comprising a glass substrate, a polarizer laminated on one surface of the glass substrate and a black matrix region disposed on the other surface of the glass substrate, wherein the color filter substrate further comprises a solar cell disposed on the glass substrate, and located between the glass substrate and the black matrix region, the polarizer comprising a hollow region to expose the glass substrate, the hollow region disposed opposite to the solar cell and the orthogonal projection of the solar cell covering the hollow region, the ambient light enters the glass substrate through the hollow region.

8. The liquid crystal display apparatus according to claim 7, wherein the orthogonal projection of the hollow region on the glass substrate is completely overlapped with the orthographic projection of the solar cell on the glass substrate, or the orthogonal projection of the hollow region on the glass substrate is within the orthographic projection of the solar cell on the glass substrate.

9. The liquid crystal display apparatus according to claim 8, wherein the ambient light is natural light.

10. The liquid crystal display apparatus according to claim 7, wherein the color filter substrate further comprises a regularly arranged sub-pixels, the black matrix region comprising a plurality of black matrix spaced apart by the sub-pixels, the solar cell is disposed between the black matrix and the glass substrate.

11. The liquid crystal display apparatus according to claim 7, wherein the color filter substrate comprises an insulating layer for isolation the electrical connection of the solar cell and the other components of the color filter substrate.

12. The liquid crystal display apparatus according to claim 7, wherein the color filter substrate further comprises a common electrode layer, and the common electrode layer covers the solar cell.

13. The liquid crystal display apparatus according to claim 7, wherein the array substrate at least comprises a glass substrate, a metal wiring provided on the surface of the glass substrate toward the liquid crystal layer, and a polarizer provided on the outer surface of the glass substrate, the liquid crystal display apparatus further comprising: a first solar cell disposed between the glass substrate of the array substrate and the metal wiring, the polarizer comprising a hollow region to expose the glass substrate, the first solar cell covers the hollow region, the orthogonal projection of the hollow region is in the black matrix region.

14. The liquid crystal display apparatus according to claim 7, wherein the metal wiring comprises a data line, a scanning line and a pixel electrode.

15. The liquid crystal display apparatus according to claim 7, wherein the liquid crystal display apparatus comprises a flexible circuit board and a backlight module, the first solar cell is electrically connected to the flexible circuit board and/or the backlight module.

* * * * *